T. A. WILLARD.
STORAGE BATTERY.
APPLICATION FILED JAN. 10, 1916.
1,248,768.
Patented Dec. 4, 1917.
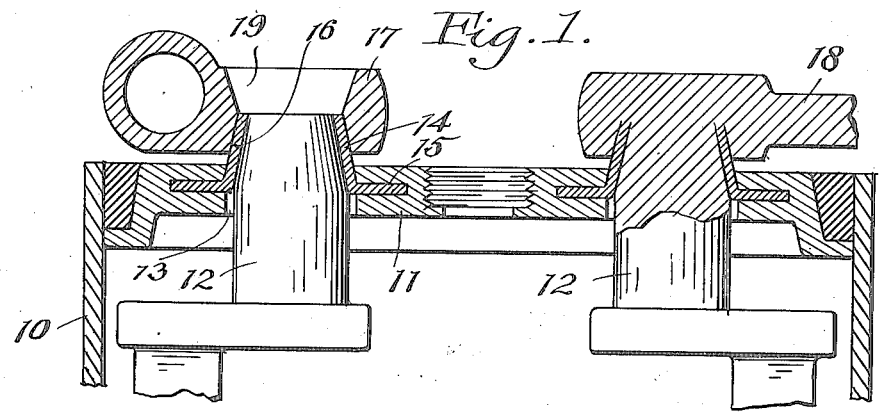
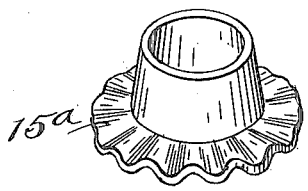
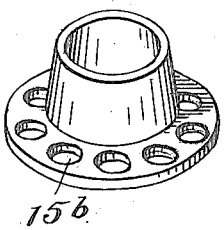
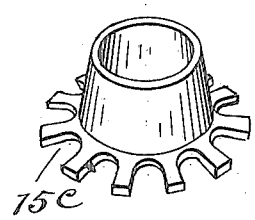
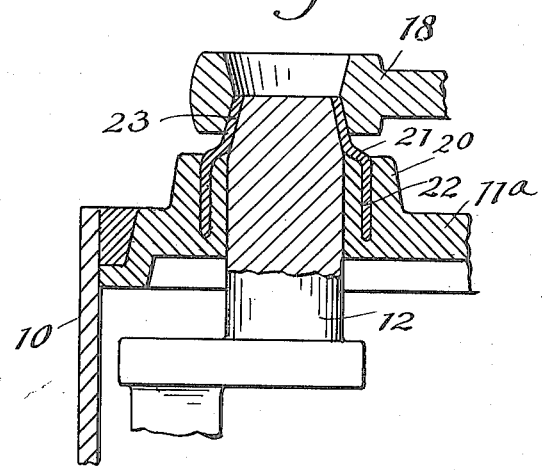
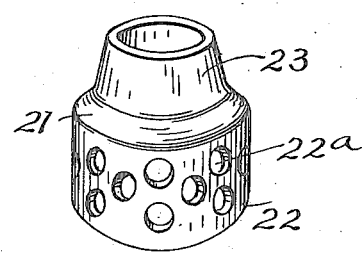
Inventor:
Theodore A. Willard
by Thurston & Kwis
Attys.

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,248,768.  Specification of Letters Patent.  Patented Dec. 4, 1917.

Application filed January 10, 1916. Serial No. 71,142.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries, and particularly to means for sealing the terminal posts in the cover. The object of the invention is to provide a simple and efficient means for sealing the post against leakage of battery solution to the exterior of the cover. A further object is to provide a sealing device of such character that the post is automatically sealed by the mere act of lead-burning or soldering the connector to the post.

My invention may be briefly summarized as consisting in certain novel details of construction and combinations and arrangements of parts which will be described in the specification and set forth in the appended claims.

In the accompanying sheet of drawings, Figure 1 is a view partly in vertical section through a storage battery embodying my invention; Figs. 2, 3 and 4 are perspective views illustrating several forms or modifications of the sealing sleeve which is employed for sealing purposes; Fig. 5 is a view particularly in side elevation and partly in vertical section, showing a modification; and Fig. 6 is a perspective view of a sealing sleeve which may be employed with the construction shown in Fig. 5.

Referring now to the drawings, 10 represents the battery jar provided with a cover 11 which may be and preferably is formed of rubber. The jar will contain positive and negative plates from which project positive and negative lead terminal posts 12 which project upwardly through openings 13 in the cover 11. These posts are preferably tapered at their upper ends and are here shown as circular in cross-section, although the circular shape is not necessary, as the posts and the parts which are associated therewith may be given any other desired shape, such as a rectangular shape.

For the purpose of sealing the post in the cover I employ a sealing sleeve, which in Fig. 1 is designated 14, said sleeve which is preferably formed of lead having a base 15 which is attached to and preferably is embedded or molded and vulcanized in the cover and having an upstanding sleeve-like extension 16 whose axis coincides with the axis of the opening 13 in the cover, and which is preferably tapered or conical to conform to the taper at the upper end of the post. These sealing sleeves, one of which is provided for each post, are so arranged that when the parts are assembled, *i. e.*, when the cover is placed in position, the upper ends of the posts extend up into the tapered parts 16 of the sleeves and engage the inner surfaces thereof. Preferably, also, when the cover is in place the upper end of each sleeve is flush or substantially flush with the upper end of the corresponding post, although it is not necessary that it be so.

The upper ends of the post are adapted to be soldered or lead-burned to lead connectors, the connectors here shown being respectively a terminal connector 17 and a cross-connector 18, the former being adapted to receive a terminal wire or conductor and the latter being adapted to connect plates of one cell to plates of the adjacent cell. These connectors are each provided with a socket 19 which is preferably tapered in opposite directions from about the center. The lower tapered part of the socket of each connector fits down snugly onto the tapered conical extension 16 of the sealing device surrounding the corresponding post and the upper tapered part is adapted to receive melted lead. When the connector is sealed to the post the melted lead fills the upper part of the socket and forms into one substantially continuous and homogeneous body the post, connector and the upper portion of the sealing sleeve, so that not only are the three parts integrally united, but by the mere act of lead-burning the parts together the upper part of the sealing device is intimately and integrally united to both the post and connector, thus forming a very effective seal which prevents leakage of any battery solution up along the post to the exterior of the cover. In Fig. 1 both connectors are in place, one being shown before and the other after the lead-burning operation which unites the connector to the post and seals the latter.

In the construction shown in Fig. 1 the flange 15 projects laterally into the cover.

This flange may be formed in various ways to secure good intimate contact between the cover and the sleeve. For example: it may be corrugated, as shown at 15ᵃ in Fig. 2, or it may be provided with perforations as shown at 15ᵇ in Fig. 3, so that the rubber will be vulcanized directly through the flange, or the flange may be provided with notches as shown at 15ᶜ in Fig. 4 to accomplish the same results.

In Fig. 5 there is shown a slight modification wherein the cover here designated 11ᵃ is provided around the opening for the post with an upstanding boss or flange 20 and the sealing device here designated 21 has an annular base or bottom portion 22 which is molded and vulcanized in the cover and flange 20 and projects upwardly from the top of the latter and is provided also with a conical upper portion 23 which is similar to the corresponding part 16 of the sleeve first described and is employed in the manner and for the purpose explained above. The lower portion 22 of the sleeve may be provided with corrugations, notches or openings such as illustrated at 22ᵃ in Fig. 6 for the purpose of anchoring the sleeve in the cover, and to secure a liquid tight joint.

While I have shown several forms of my invention, I do not desire to be confined to the exact details shown and described, but aim in my claims to cover all modifications which do not involve a departure from the spirit and scope of my invention in its broadest aspect.

Having thus described my invention, what I claim is:—

1. In a storage battery, a battery jar or container having a cover, a terminal post projecting through the cover, a connector receiving the post, and a sealing device surrounding the post and having a portion molded in the cover and another portion interposed between the connector and post.

2. In a storage battery, a jar or container having a cover provided with an opening, a terminal post extending through the opening, a connector attached to the post, and a sealing sleeve attached to and projecting above the cover around the post, the post and sleeve being formed of like material and being integrally united above the cover.

3. In a storage battery, a jar or container having a cover provided with an opening, a terminal post extending through the opening, a connector receiving the end of the post, and a sealing sleeve embedded in the body of the cover and projecting from the cover and interposed between the post and connector.

4. In a storage battery, a jar or container having a cover provided with an opening, a terminal post extending through the opening, and a sealing sleeve having its base or lower portion embedded in the cover around the post, the post and sleeve being formed of like material and integrally united above the cover.

5. In a storage battery, a jar or container having a cover provided with an opening, a terminal post extending through the opening, a connector receiving the end of the post and a sealing sleeve embedded in the cover around the post and having a portion interposed between the post and the connector and integrally united to both of the same.

6. In a storage battery, a jar or container having a cover provided with an opening, a metallic terminal post extending through the opening, a connector receiving the end of the post, and a metallic sealing sleeve carried by the cover and having its lower portion secured in the cover around the opening and integrally united to the connector above the cover.

7. In a storage battery, a jar or container having a cover provided with an opening, a terminal post projecting through the opening, a connector having a socket receiving the upper end of the post, and a sealing sleeve embedded in the cover around said opening and integrally united to the post and connector.

8. A storage battery comprising a jar or container having a cover provided with an opening, a post having a tapered upper end projecting through the opening, a sealing sleeve concentrically arranged with said opening and provided with a base embedded in the cover and with an upstanding tapered portion, a connector having a socket receiving both the tapered end of the post and the tapered portion of the sleeve and lead-burned to both the latter.

9. As an article of manufacture, a storage battery cover molded in one piece and having openings for terminal posts, and lead sealing sleeves embedded therein around the openings and projecting upwardly therefrom, said sleeves forming a permanent part of the cover and a unitary structure therewith.

In testimony whereof, I hereunto affix my signature.

THEODORE A. WILLARD.